Nov. 19, 1957 M. E. MEYERS 2,813,338
NAVIGATORS PLOTTING BOARD
Filed June 5, 1953 2 Sheets-Sheet 1

MAE E. MEYERS
INVENTOR.

ATTORNEY

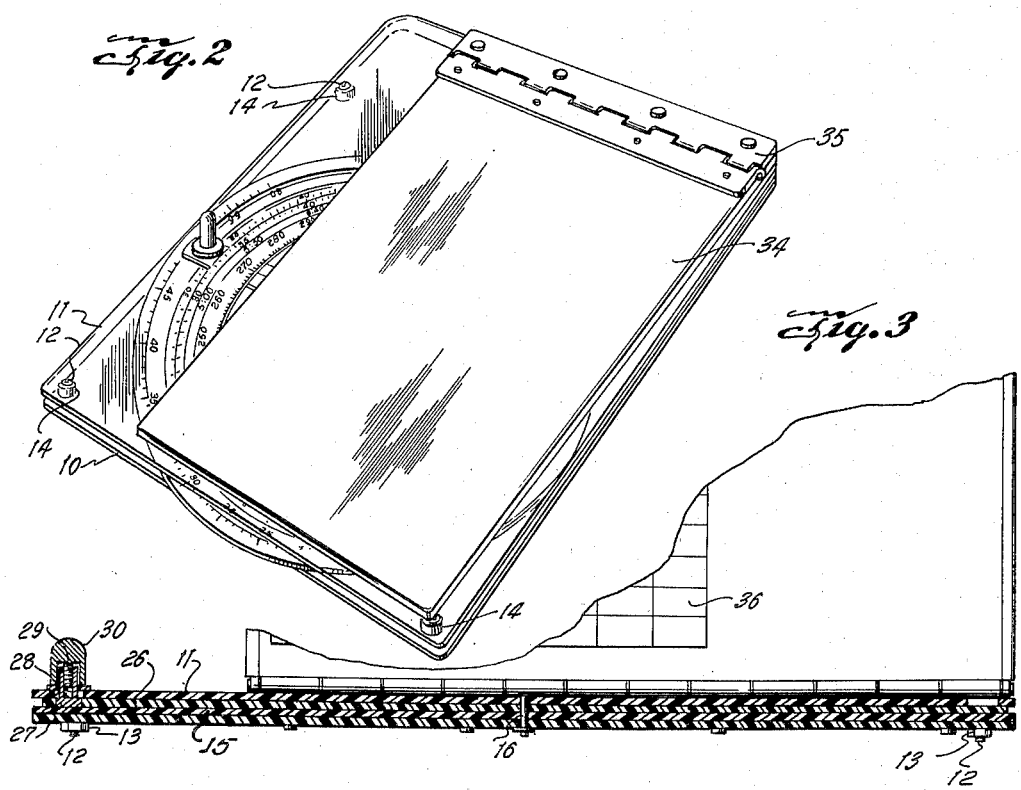

United States Patent Office 2,813,338
Patented Nov. 19, 1957

2,813,338
NAVIGATORS PLOTTING BOARD
Mae Estelle Meyers, Grand Prairie, Tex.

Application June 5, 1953, Serial No. 359,718

1 Claim. (Cl. 33—1)

This invention relates to navigation instruments and more particularly to an instrument to be used in the navigation of aircraft.

An object of the invention is to provide a new navigation instrument which is of small size and easy to operate.

Another object of the invention is to provide a new and improved navigation instrument which makes possible a very fast solution to navigational problems.

Still another object of the invention is to provide a new and improved navigation instrument which permits fast solution of navigational problems by reducing the number of lines which must be drawn and erased during the process of solving the problems.

With the foregoing objects in view, the invention has further reference to certain features of accomplishment which will become apparent as the description proceeds, taken in connection with the accompanying drawings.

In the drawings:

Figure 2 is a perspective view of the navigation instrument;

Figure 3 is a sectional view of the navigation instrument showing the log plate in raised position and partly broken away; and, Figure 4 is a fragmentary sectional view of the instrument showing a log chart mounted on the log plate.

Figure 1:
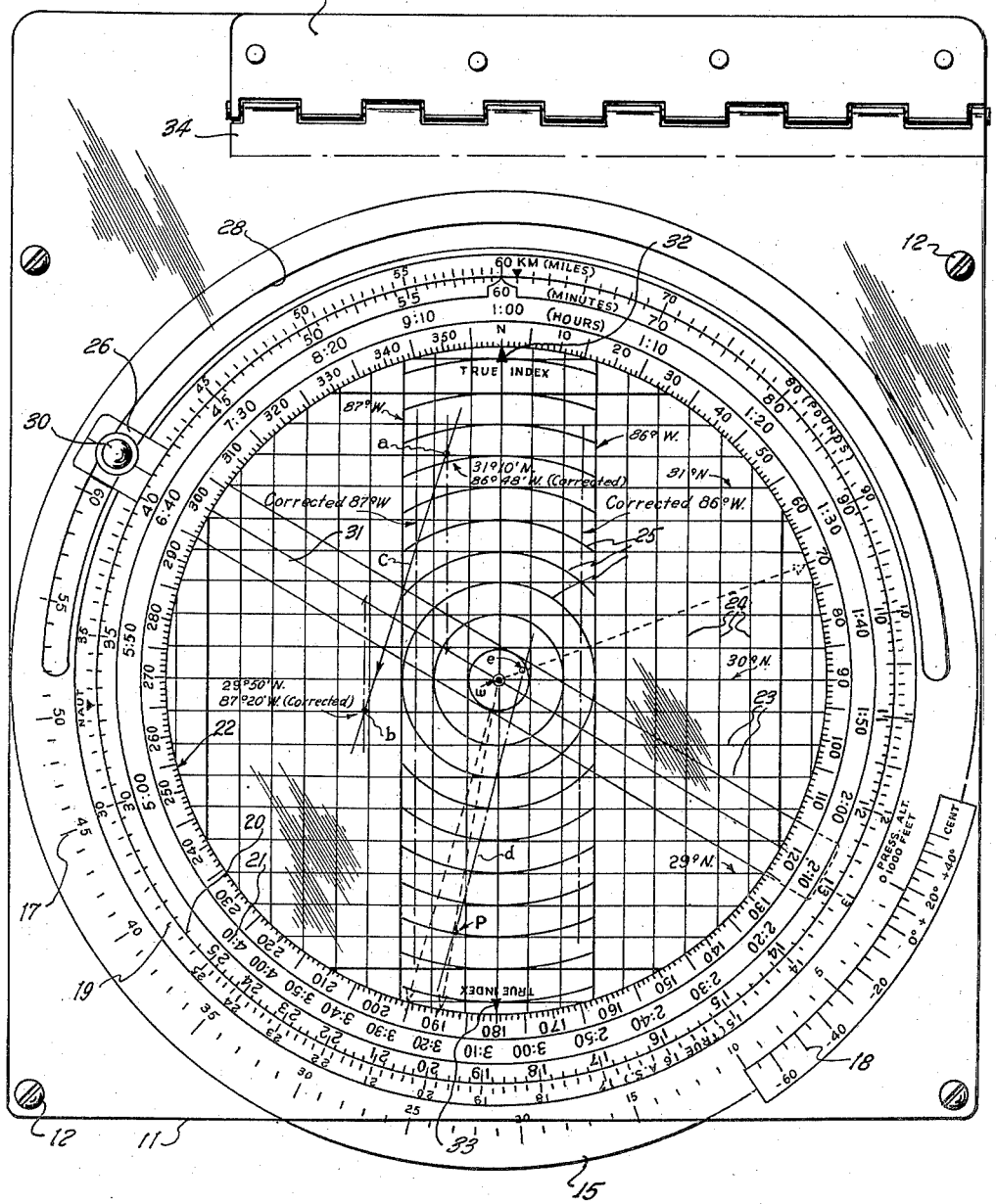
Figure 1 is a plan view of the navigation instrument with a log plate broken away to reveal the other elements of the device.

Referring now to the drawing, the numeral 10 designates a rectangular base plate to which is secured a top plate 11 of transparent substance on which pencil lines may be drawn. The top plate is rigidly secured to the base plate by bolts 12 and nuts 13. Spacers 14 on the bolts 12 hold the top plate spaced above the base plate.

An opaque grid disk 15 is rotatably mounted between the top and base plates by means of a pivot pin 16, the opaque disk being rotatable about the pin. The outer scale 17 on the upper surface of the opaque disk 15 represents altitude and cooperates with a temperature scale 18 on the top plate 11 to locate the grid disk for certain computations where the altitude of the aircraft and the temperature of the air at that altitude must be considered to arrive at a proper result.

A second scale 19 on the grid disk is marked off to indicate air speed and is positioned immediately outerly of a pair of scales 20 and 21 of the top plate which indicate time in minutes and hours, respectively. The innermost scale 22 of the top plate indicates azimuth.

The grid disk has a grid formed of two sets of parallel lines 23 and 24 which intersect perpendicularly and a plurality of concentric circles 25, or portions thereof, which have the axis of rotation of the grid disks as their center.

An arm or strip 26 of a transparent material, such as plastic, is interposed between the top plate and the grid disk and is pivotally mounted on the pin 16. A stud 27 is secured to the arm at one end thereof which projects upwardly through an arcuate slot 28 of the top plate. The stud has a threaded bore in which is received the threaded central rod 29 of a cap 30 whose lower edge is adapted to bear against the upper surface of the top plate and so lock the arm against rotation when the cap is screwed down.

The arm 26 has a central line 31 marked on it which passes through the axis of rotation of the grid disk and of the axis of pivot of the arm 26.

The manner in which the navigation instrument may be used in the navigation of an aircraft may perhaps be best set forth by showing how specific navigational problems may be solved by its use.

Suppose the problem is to fly from A at 31° 10′ N., 86° 48′ W. to B which is at 29° 50′ N. 87° 20′ W.

The known facts are that the speed of the aircraft is 400 knots per hour and the wind is 40 knots per hour from 70°; and it is desired to find:

A. Course
    B. True heading
    C. Time in route

To find the course, the following procedure is followed:

(1) With grid disk at the True Index 32 on 0° or north on the azimuth scale 22, the latitude is set off normally on the transparent top plate by pencil marks. The center line 23 passing through the axis of rotation of the grid disk is to be regarded as 30° N., one of the lines 23 above the center line 23 is to be regarded as 31° N. and one of the lines 23 below the center line is to be regarded as 29° N.

(2) The longitude is read by means of the lines 24 of the grid disk and the center line 31 of the movable arm 26. By means of the line 31 the longitude may be read for any latitude. If the line 31 is not used, the grid disk is usable only at the equator. The line 31 of the arm 26 must be set at the mid-latitude at which the aircraft is to fly. In the present case the arm 26 is moved, by loosening the nut 30, so that its center line 31 is 30° above the scale marker 270°, which represents the equator, since the mid-latitude at which the aircraft is to fly is 30° N. The grid disk is then rotated until its true index line 32 is aligned with the center line 31 of the arm 26. The longitude is then read along the line 31 by the circles 25. Intervals or minute marks which correspond to the longitude of "a" and "b" are marked on the surface of the top plate along the center line 31 of the arm 26 as determined by the intersection of the line 31 with the circles 25 and/or the lines 23. By projecting vertical lines from the minute marks it will be seen that they do not coincide with the vertical lines that would have been used at the equator. The grid disk is then rotated until the true index 32 is again on 0° or north. Vertical lines are then projected from the minute marks to find the intersections of the corrected longitude lines and the previously set off latitude lines to find the corrected and true locations of 86° 48′ W. and 87° 20′ W. which are indicated by the letters "a" and "b" respectively.

A line c is then drawn between these two established points a and b and the grid disk is rotated until the lines 24 are disposed parallel to the line c. The part on the azimuth scale indicated by the True Index 33, in this case 195°, is the course.

It will be noted that the center line 31 of the arm 26 obviates the necessity of drawing and erasing a mid latitude line on the top plate and thus facilitates the finding to be used as the longitude coordinate of the course. In addition, the absence of such a pencilled additional line on the top plate obviates possibilities of confusion caused by the presence of too many pencilled lines on the top plate.

The grid disk may be set up so that three of the circles 25 may equal one degree or one half degree. Thus, the grid disk can represent a usable mercator chart space of 3° or 6°.

To find the true heading, the following procedure is followed:

(1) Let the space between circles equal 50 nautical miles. (arbitrary)

(2) Set True Index on 70° on the azimuth scale.

(3) Measure along True Index line, from center 40 knots or speed of the wind. Call this point $e$.

(4) Move True Index until it is set on course or 195°.

(5) Draw a line $d$ parallel to the True Index line through point $e$.

(6) Measure by circles (50 nautical miles per interval), a speed of 400 knots along line $d$ and set off point P.

(7) Revolve True Index line to parallel the line $d$ from $e$ to P. Measure by grid intervals the distance from $e$ to P. This is your Ground Speed=425 K. P. H.

(8) To find true heading turn True Index line until it passes through point P. Read True Index on the azimuth. This is the True Heading=190°.

To find time in route, the following procedure is followed:

(1) Read miles between starting point and destination by using grid lines 23=88 nautical miles.

(2) Set grid disk so that 425 on scale 19 is above 60 (on time scale 20).

(3) Read again on time scale 20 the point opposite 88 nautical miles on the scale 19. This will give you your time in route=12.5 minutes.

It will now be seen that the use of the movable arm 26 permits easy solution of navigational problems without the drawing of a longitude line and its subsequent necessary erasure. It will also be evident that the movable arm is transparent so that the lines on the grid disk are visible therethrough permitting the laying off of minute intervals along the center line 31 of the movable arm. It will also be evident that the arm may be locked in any desired position by means of the screw cap 30.

A log plate 34 is attached to the top plate 11 by a hinge 35. The log plate has a log chart 36 on which various navigational information may be erasably recorded.

The navigational instrument described above may also be employed as an emergency sextant using the movable arm to discover the angular displacement of a celestial body above the horizon. In this use, of course, the instrument is held in a vertical position.

It may also be used to discover the relative bearing of an object by aligning the 0° index in the direction of movement of the aircraft and then aligning the movable arm with the object. The angular position of the movable arm on the azimuth scale then indicates the position of the object relative to the aircraft.

Manifestly, the construction as shown and described is capable of some modification and such modification as may be construed to fall within the scope and meaning of the appended claims is also considered to be within the spirit and intent of the invention.

What is claimed:

A device of the type described comprising: a base plate; a transparent top plate secured to said base plate, said plates being disposed in parallel planes; a grid disk rotatably mounted between said plates about an axis perpendicular to said parallel planes, said disk having two sets of parallel lines forming a grid on its surface adjacent said top plate, said disk also having a plurality of arcuate lines concentric about said axis, said arcuate lines being spaced a distance equal to the spacing between the lines of each set of said parallel lines, said top plate having a circular azimuth scale concentric with said axis; a movable strip rotatably mounted between said grid disk and said top plate for pivotal movement about said axis; said strip being transparent and having a longitudinal central line cooperable with said arcuate lines for use as a longitude scale, said top plate having an arcuate slot; and means secured to said strip and extending through said slot for locking said strip to said top plate to hold said strip immovable in any adjusted position about said axis.

References Cited in the file of this patent

UNITED STATES PATENTS

| | | |
|---|---|---|
| 1,859,569 | Lonnquest et al. | May 24, 1932 |
| 2,007,986 | Sprague | July 16, 1935 |
| 2,013,603 | Dalton | Sept. 3, 1935 |
| 2,408,571 | Mitchell | Oct. 1, 1946 |
| 2,438,730 | Watter | Mar. 30, 1948 |
| 2,545,935 | Warner | Mar. 20, 1951 |
| 2,546,836 | Saloschin | Mar. 27, 1951 |
| 2,674,804 | Reinhardt | Apr. 13, 1954 |

FOREIGN PATENTS

| | | |
|---|---|---|
| 124,329 | Great Britain | Mar. 27, 1919 |